US011588806B2

(12) United States Patent
Shaw et al.

(10) Patent No.: US 11,588,806 B2
(45) Date of Patent: *Feb. 21, 2023

(54) AUTHENTICATION SERVICE

(71) Applicant: VMware, Inc., Palo Alto, CA (US)

(72) Inventors: David Shaw, Buford, GA (US); Daniel E. Zeck, Roswell, GA (US); Robert Worsnop, Dunwoody, GA (US)

(73) Assignee: VMware, Inc., Palo Alto, CA (US)

( * ) Notice: Subject to any disclaimer, the term of this patent is extended or adjusted under 35 U.S.C. 154(b) by 22 days.

This patent is subject to a terminal disclaimer.

(21) Appl. No.: 17/106,878

(22) Filed: Nov. 30, 2020

(65) Prior Publication Data

US 2021/0084026 A1  Mar. 18, 2021

Related U.S. Application Data

(63) Continuation of application No. 15/970,020, filed on May 3, 2018, now Pat. No. 10,855,669.

(51) Int. Cl.
*H04L 9/40* (2022.01)
*H04L 9/32* (2006.01)
*H04L 9/08* (2006.01)
*H04L 43/10* (2022.01)
*H04L 67/568* (2022.01)

(52) U.S. Cl.
CPC ........ *H04L 63/0815* (2013.01); *H04L 9/0894* (2013.01); *H04L 9/3213* (2013.01); *H04L 9/3228* (2013.01); *H04L 43/10* (2013.01); *H04L 63/0807* (2013.01); *H04L 67/568* (2022.05)

(58) Field of Classification Search
CPC ........................ H04L 63/0815; H04L 63/0807
See application file for complete search history.

(56) References Cited

U.S. PATENT DOCUMENTS

| 8,544,072 | B1* | 9/2013 | Masone | H04L 63/0815 |
| | | | | 726/8 |
| 8,613,055 | B1* | 12/2013 | Tomilson | G06F 21/335 |
| | | | | 726/20 |
| 9,319,395 | B2* | 4/2016 | Forster | H04L 63/061 |
| 9,462,044 | B1* | 10/2016 | Preibisch | H04L 63/0823 |
| 9,531,538 | B2 | 12/2016 | Chang et al. | |
| 9,674,699 | B2* | 6/2017 | Kanov | H04W 12/069 |
| 9,923,888 | B2* | 3/2018 | Goel | H04L 67/141 |
| 10,462,121 | B2* | 10/2019 | Li | G06F 21/44 |

(Continued)

FOREIGN PATENT DOCUMENTS

WO          2016123416          8/2016

*Primary Examiner* — James R Turchen
(74) *Attorney, Agent, or Firm* — Thomas | Horstemeyer, LLP

(57) ABSTRACT

Disclosed are various approaches for relaying and caching authentication credentials. A single sign-on (SSO) token is received, the SSO token representing a user account authenticated with an identity manager. An authentication request is then sent to a service that is federated with the identity manager in response to receipt of the SSO token, the authentication request including the SSO token. An access token is received in response to the authentication request, the access token providing access to the service for the user account authenticated with the identity manager for a predefined period of time. The access token and a link between the access token and the SSO token are then cached.

20 Claims, 5 Drawing Sheets

(56) References Cited

U.S. PATENT DOCUMENTS

| | | | |
|---|---|---|---|
| 2006/0021252 A1 | 9/2006 | Logue et al. | |
| 2006/0023638 A1 | 10/2006 | Hinton et al. | |
| 2007/0208936 A1* | 9/2007 | Ramos Robles | H04L 63/0815 713/168 |
| 2008/0024468 A1 | 1/2008 | McClain et al. | |
| 2008/0072301 A1* | 3/2008 | Chia | H04L 63/0815 726/8 |
| 2009/0012597 A1 | 5/2009 | Hinton et al. | |
| 2009/0248632 A1 | 10/2009 | Subramanian | |
| 2009/0032009 A1 | 12/2009 | Nanda et al. | |
| 2010/0251010 A1 | 9/2010 | Peters et al. | |
| 2012/0011578 A1* | 1/2012 | Hinton | H04L 63/0815 726/8 |
| 2013/0054968 A1* | 2/2013 | Gupta | H04L 63/083 713/168 |
| 2013/0086669 A1* | 4/2013 | Sondhi | H04W 12/068 726/8 |
| 2014/0028299 A1 | 9/2014 | Engelhart | |
| 2014/0310792 A1* | 10/2014 | Hyland | H04L 63/0861 726/8 |
| 2014/0373099 A1* | 12/2014 | Durbha | H04L 63/10 726/4 |
| 2014/0373126 A1* | 12/2014 | Hussain | H04L 63/0807 726/9 |
| 2015/0000726 A1 | 1/2015 | Stewart et al. | |
| 2015/0007263 A1* | 1/2015 | Stewart | H04L 63/0815 726/3 |
| 2015/0074407 A1 | 3/2015 | Palmeri et al. | |
| 2015/0121501 A1 | 4/2015 | Khalid et al. | |
| 2015/0350186 A1 | 12/2015 | Chan et al. | |
| 2016/0028737 A1* | 1/2016 | Srinivasan | H04L 63/0807 726/4 |
| 2016/0205108 A1* | 7/2016 | Si | H04L 63/126 726/4 |
| 2016/0313882 A1* | 10/2016 | Brown | G06F 40/106 |
| 2017/0004129 A1 | 2/2017 | Ford et al. | |
| 2017/0142108 A1* | 5/2017 | Zhang | H04L 63/0807 |
| 2018/0077143 A1* | 3/2018 | Sridharan | H04L 63/0807 |
| 2018/0033043 A1 | 11/2018 | Akhter et al. | |
| 2018/0330431 A1* | 11/2018 | Akhter | G06Q 30/0637 |
| 2019/0095310 A1* | 3/2019 | Liran | H04L 67/535 |

* cited by examiner

AUTHENTICATION SERVICE

CROSS-REFERENCE TO RELATED APPLICATIONS

This application is a continuation of, and claims priority to and the benefit of, co-pending U.S. patent application Ser. No. 15/970,020, entitled "AUTHENTICATION SERVICE," filed May 3, 2018, which is incorporated by reference herein as if set forth in its entirety. This application is related to co-pending U.S. patent application Ser. No. 15/970,026, entitled "POLLING SERVICE," filed on May 3, 2018, and to co-pending U.S. patent application Ser. No. 17/106,739, entitled "POLLING SERVICE," filed on even date herewith, both of which are incorporated by reference herein as if set forth in their entirety.

BACKGROUND

Users use authentication credentials to login to various applications or various services. Often times, these authentication credentials differ from service to service, even though they represent the same individual. For example, a user can rely on a cryptographic certificate to access one service, a first username and a first password to access a second service, and a different username and/or password to authenticate with a third service.

These services can also be configured to provide data or notifications to a user if the user is authenticated with the service. For example, if a user is logged into a web-application, the web-application can periodically update a user interface element to notify a user of new messages or events. However, when the user is not logged into the web-application, the user is unaware of the events or notifications.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various examples for relaying authentication credentials of users on behalf of one or more applications or services. In order to avoid a user having to separately authenticate with multiple services, the user can authenticate with a single sign-on user interface of an identity manager. The user can then be authenticated in the background with various services, and the corresponding authentication information can be cached. The cached authentication information can be used in the future by various programs on behalf of the user, thereby avoiding any requirement of the user to authenticate directly with the services.

Figure 1:
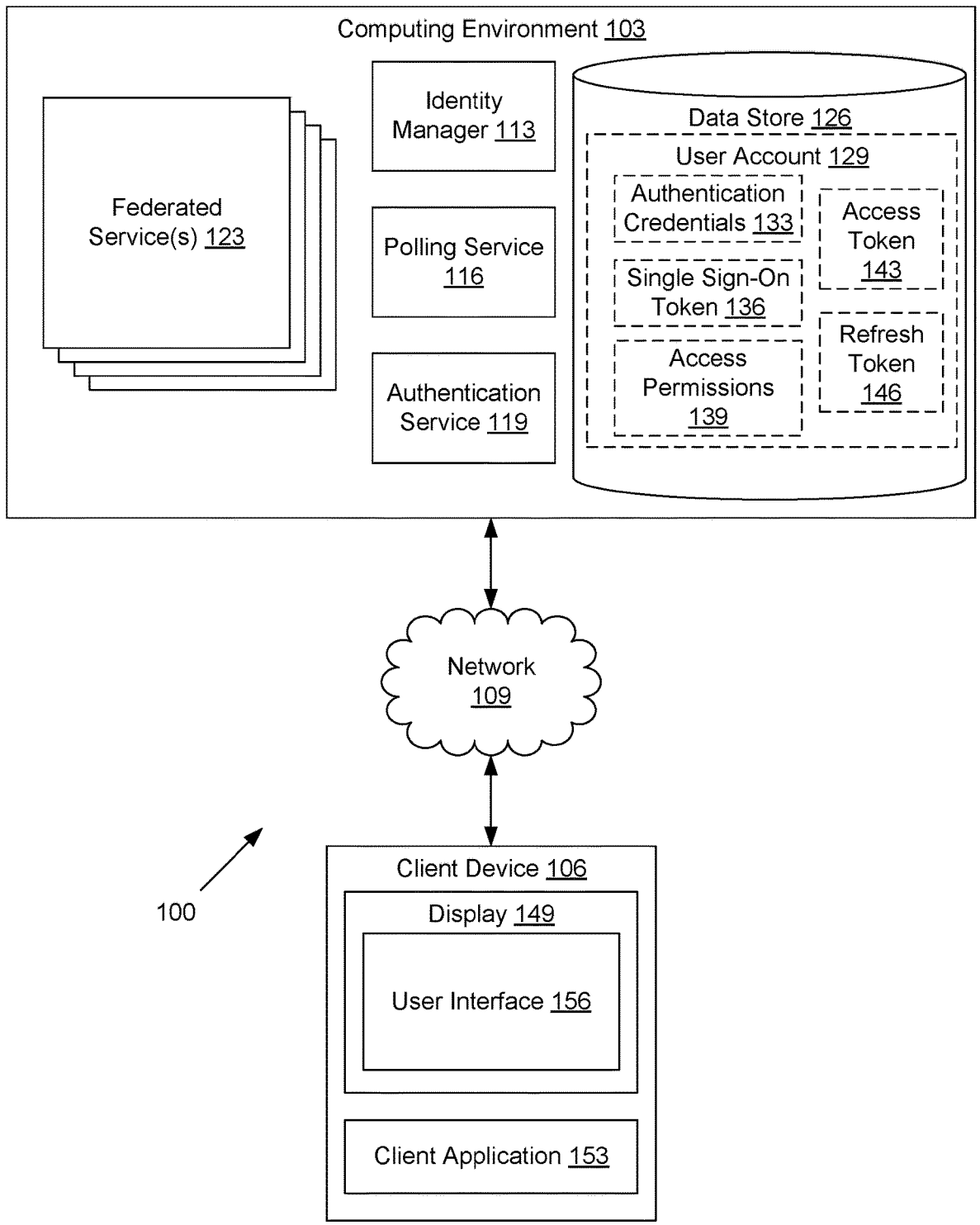
FIG. 1 is a schematic block diagram depicting an example of a network environment

Beginning with FIG. 1, shown is an example of a networked environment 100. The networked environment 100 includes a computing environment 103 and a client device 106, which are in data communication with each other across a network 109. The network 109 includes wide area networks (WANs) and local area networks (LANs). These networks can include wired or wireless components or a combination thereof. Wired networks can include Ethernet networks, cable networks, fiber optic networks, and telephone networks, such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 109 can also include a combination of two or more networks 109. Examples of networks 109 can include the Internet, intranets, extranets, virtual private networks (VPNs), and similar networks.

The computing environment 103 can include, for example, a server computer or any other system providing computing capability. Alternatively, the computing environment 103 can employ a plurality of computing devices that can be arranged, for example, in one or more server banks or computer banks or other arrangements. These computing devices can be located in a single installation or can be distributed among many different geographical locations. For example, the computing environment 103 can include a plurality of computing devices that together can include a hosted computing resource, a grid computing resource or any other distributed computing arrangement. In some cases, the computing environment 103 can correspond to an elastic computing resource where the allotted capacity of processing, network, storage, or other computing-related resources can vary over time.

Various applications or other functionality can be executed in the computing environment 103 according to various examples. The components executed in the computing environment 103, for example, can include an identity manager 113, a polling service 116, and an authentication service 119. One or more federated services 123 can also be executed in the computing environment 103. In some embodiments, however, one or more of the federated services 123 can be executed in a separate computing environment that is in data communication with the computing environment 103 across the network 109.

Also, various data is stored in a data store 126 that is accessible to the computing environment 103. The data store 126 can be representative of a plurality of data stores, which can include relational databases, object-oriented databases, hierarchical databases, hash tables or similar key-value data stores, as well as other data storage applications or data structures. The data stored in the managed data store 126 is associated with the operation of the identity manager 113, the polling service 116, the authentication service 119, one or more of the federated services 123, as well as potentially other applications or functional entities described later. This data can include one or more user accounts 129 and potentially other data.

The identity manager 113 can authenticate users and manage user authorizations or permissions to access applications, data, or other computing resources. For example, the identity manager 113 could correspond to a single sign-on portal that verifies a user's authentication credentials 133, issues a single sign-on token 136 that identifies the user, and verifies whether the user has the appropriate access permissions 139 to access one or more federated services 123. Examples of identity managers 113 include AMAZON's AWS Identity and Access Management (IAM) service, VMWARE's Identity Manager, or MICROSOFT's Active Directory Federation Services.

The polling service 116 can monitor one or more federated services 123 that a user is authorized to access. For example, the polling service 116 can periodically query a federated service 123 for notifications, updates, messages, changes, actions to be performed, or other events. If a notification, update, message, change, action to be performed, or other event is identified, the polling service 116 can then notify the user. For example, the polling service 116 could send a message to the client device 106 to notify the user.

The authentication service 119 can retrieve and cache authentication data, such as access tokens 143 and refresh tokens 146, provided by various federated services 123. The cached authentication data can be used by the polling service 116 to query the federated services 123 for information. In some embodiments, use of the authentication service 119 may be invisible to the user. In other embodiments, the user may be asked to opt-in to the use of the authentication service through a web-portal or other user interface. Such a web-portal or other user interface may be provided, for example, by the identity manager 113.

A federated service 123 can be web application, web service, or other network facing application that can be accessed using a shared identity manager 113. One or more federated services 123 can be provided by the same provider or by different providers.

The user account 129 represents information associated with a user. The information can include one or more authentication credentials 133, one or more single sign-on tokens 136, and/or one or more access permissions 139 applied to the user account, as well as cached access tokens 143 and refresh tokens 146. Other information about the user can also be stored as part of the user account 129, such as the user's name or contact information.

The authentication credentials 133 represent the credentials that a user can present to the identity manager 113 to authenticate the user's identity. Authentication credentials 133 can include a combination of a username and password, a cryptographic certificate, a one-time password, or a combination of several of authentication credentials 133 as part of a multi-factor authentication schema. Examples of one-time passwords can include a one-time password generated using a version of the time-based one-time password algorithm (TOTP) or a one-time password generated using the HMAC-based one-time password (HOTP) algorithm.

The single sign-on (SSO) token 136 is a software token generated by the identity manager 113 in response to a successful authentication of the user with the identity manager 113 using the authentication credentials 133. The SSO token 136 can be used to provide the client device 106 access to various federated services 123 on behalf of the authenticated user. In some instances, such as those implementing a version of the KERBEROS protocol, a separate SSO token 136 can be generated for each federated service 123 that the client device 106 attempts to access on behalf of the user. In other instances, the single SSO token 136 can be generated and used to provide the client device 106 with access to several of the federated services 123. Although each of the federated services 123 can have a different set of authentication credentials 133 linked to the user account 129, such as a different user name and password combination, the SSO token 136 allows the user to authenticate once with the identity manager 113 in order to use each of the federated services 123 instead of having to authenticate with each of the federated services 123 separately.

The access permissions 139 represent computing resources that the user account is authorized to access. For example, the access permissions 139 can indicate that a user account is permitted to access some federated services 123 but is prohibited from accessing other federated services 123. As another example, the access permissions 139 can indicate that the user account 129 is allowed to access certain features of a federated service 123, but prohibited from accessing other features. For example, if one of the federated services 123 that a user was permitted to access was a customer relationship management (CRM) service, the user might have permission to access his or her own contacts but be prohibited from accessing the sales contacts of other users.

The access token 143 is a token provided by one of the federated services 123 in response to a successful authentication with the federated service 123. The access token 143 represents that a user account 129 is currently authorized to access or otherwise interact with the federated service 123. For security purposes, the access token 143 often has a time-limit associated with it, such as 1 hour, 3 hours, 6 hours, 8 hours, or some other period of time). Once the time-limit has expired, the access token 143 can no longer be used to prove current authentication status of the user account 129 with the federated service 123. The access token 143 can be provided, for example, as part of an authentication exchange using a version of the OAUTH protocol.

The refresh token 146 is a token provided by one of the federate services 123 in response to a successful authentication with the federated service 123. The refresh token 146 can be used to acquire a new access token 143 once a current or previous access token 143 expires. The refresh token 146 often has a much longer time-limit associated with it, such as 1 day, 1 week, 30 days, 3 months, or 1 year, which allows for the refresh token 146 to be used to acquire a series of access tokens 143 after an initial successful authentication. In the event that a user's access is revoked, the refresh token 146 can be marked invalid, preventing the refresh token 146 from being used to acquire new access tokens 143. The refresh token 146 can be provided, for example, as part of an authentication exchange using a version of the OAUTH protocol.

The client device 106 is representative of a plurality of client devices 106 that can be coupled to the network 109. The client device 106 can include, for example, a processor-based system such as a computer system. Examples of these computer systems can include a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), or other devices with like capability. The client device 106 can include one or more displays 149, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 106 or can be connected to the client device 106 through a wired or wireless connection.

The client device 106 can be configured to execute various applications such as one or more client applications 153. The client application 153 can cause a user interface 156 to be rendered on the display 149. For example, the client application 153 could be a web browser and the user interface 156 could include a web page rendered within a browser window. As another example, the client application 153 could be a standalone application that uses data provided by one or more federated services 123 to generate a user interface 156 to facilitate a user's interactions with the client application 153.

Next, a general description of the operation of the various components of the networked environment 100 is provided. A more detailed description of the implementations of various examples of the present disclosure is provided later in the discussion of the subsequent figures.

To begin, a user of the client device 106 authenticates with the identity manager 113. For example, the identity manager 113 can generate and send a web page to a browser executing on the client device 106. The user can use the web page to submit his or her authentication credentials 133 to the identity manager 113. The identity manager 113 can then determine whether the submitted authentication credentials 133 match the authentication credentials 133 stored for the user account 129. If the authentication credentials 133 match, the identity manager 113 determines that the user is authenticated. In response, the identity manager 113 can generate an SSO token 136 to represent the authenticated user. In some embodiments, the identity manager 113 can also notify the authentication service 119 of the authentication event. In these embodiments, the notification can include a user identifier and the SSO token 136. In other embodiments, the identity manager 113 can instead provide the SSO token 136 to the client application 153 executing on the client device 106. In these embodiments, the client application then provides the SSO token 136 to the authentication service 119.

The authentication service 119 can then authenticate the user with one or more of the federated services 123 in the background. For example, the authentication service 119 can send the user's SSO token 136 to each federated service 123 that an access permission 139 indicates a user is authorized to access. In other instances, the authentication service 119 can send the user's SSO token 136 to every federated service 123 that is registered with the identity manager 113. In some embodiments, the SSO token 136 can be included in an authentication request that complies with a version of the OAUTH protocol.

In response to an authentication request from the authentication service 119, the federated service verifies that the user account 129 associated with the SSO token 136 is allowed to access the federated service 123. For example, the federated service 123 can query the data store 126 to retrieve a username or other user identifier for the user account 129 associated with the single sign-on token 136. The federated service 123 can then compare the retrieved username or other user identifier with its own list of registered or authorized users. If the retrieved username or other user identifier matches a username or user identifier stored in the list of registered or authorized users maintained by the federated service 123, then the federated service 123 can determine that the user account 129 linked to the SSO token 136 is authorized to access the federated service 123. Upon successful authorization, the federated service 123 can generate an access token 143 and a refresh token 146 and provide them to the authentication service 119. In some instances, the access token 143 and the refresh token 146 can be included in a response that complies with a version of the OAUTH protocol.

The authentication service 119 can then cache or otherwise store the access token 143 and the refresh token 146 for future use. The authentication service 119 can, for example, provide the access token 143 in response to requests from authorized applications. For example, the authentication service 119 can provide the access token 143 for the user in response to a request from the polling service 116.

In addition, the authentication service 119 can automatically obtain a new access token 143 for the user when the current access token 143 expires or is about to expire. For example, the authentication service 119 can determine that the access token 143 was obtained 59 minutes ago, but is only valid for one hour. As another example, the authentication service 119 can determine that the access token 143 was obtained 61 minutes ago, but the access token 143 was only valid for one hour. In response to either example, the authentication service 119 can submit a second authentication request to the federated service 123. The second authentication request can include the refresh token 146.

In response, the federated service 123 can evaluate the refresh token 146 to determine whether the refresh token 146 is still valid. For example, the federated service 123 could evaluate the refresh token 146 to determine whether it has expired. As another example, the federated service 123 could evaluate the refresh token 146 to determine whether it has been revoked. If the refresh token 146 remains valid, the federated service 123 can then provide the authentication service 119 with a new access token 143.

Figure 2:
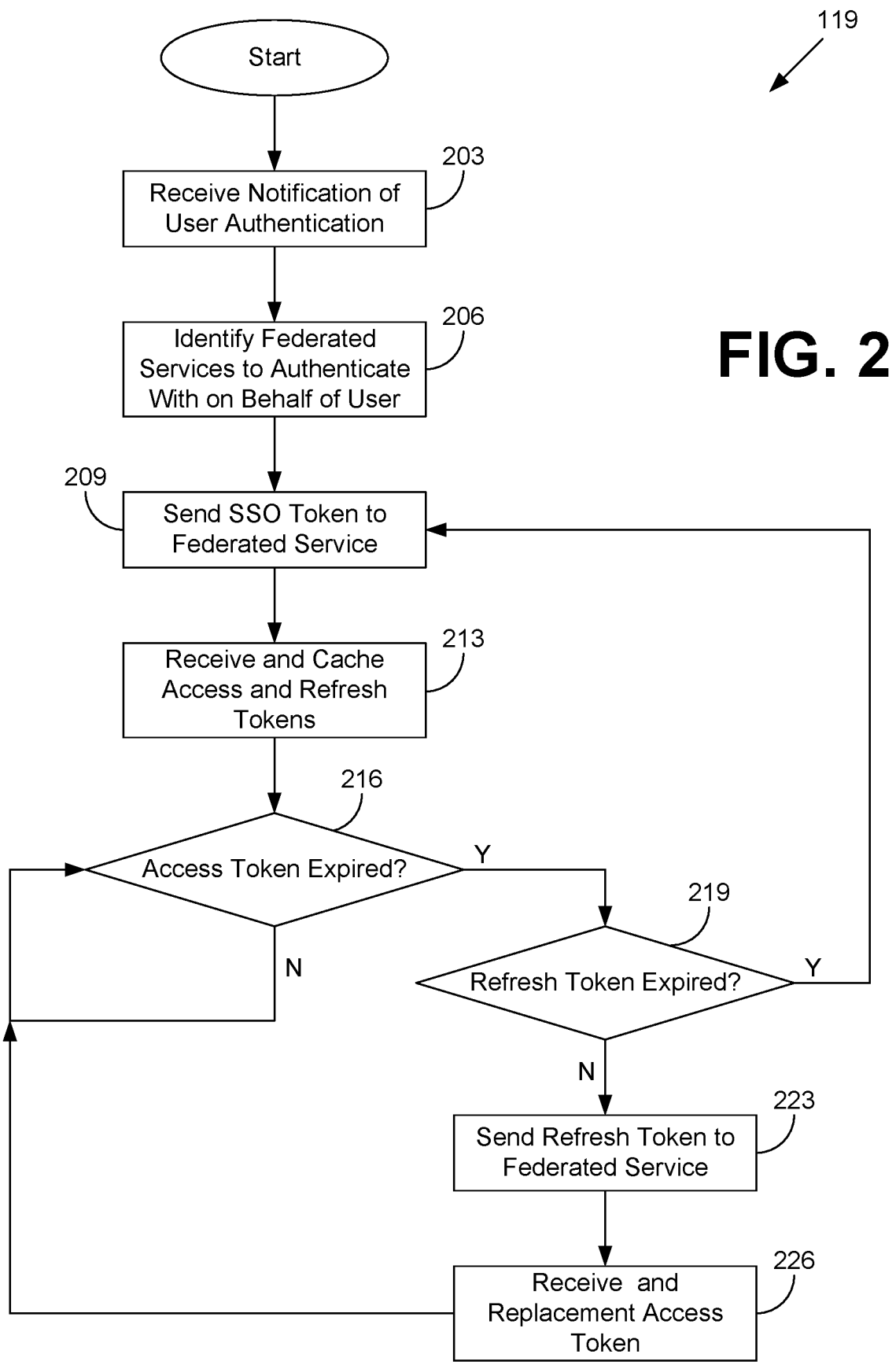
FIG. 2 is a flow chart depicting the operation of an example of a component of the client device of the network environment of FIG. 1.

FIG. 2 is a flowchart depicting an example of the operation of a portion of the authentication service 119. It is understood that the flowchart of FIG. 2 provides merely an example of the many different types of functional arrangements that can be employed to implement the portion of the authentication service 119 as described herein. As an alternative, the flowchart of FIG. 2 can be viewed as depicting an example of elements of a method implemented by the authentication service 119 in some implementations.

Beginning at step 203, the authentication service 119 can receive a notification that a user has successfully authenticated. The notification can include an identifier of the user account and an SSO token 136 for the user account. The SSO token 136 can be included, for example, in a JSON web token. In some instances, the notification can be received from the identity manager 113. In other instances, the notification can be received from the client application 153 executing on the client device 106.

Moving on to step 206, the authentication service 119 can identify which federated services 123 the authentication service 119 is to authenticate with on behalf of the user represented by the user account 129. For example, the authentication service 119 could check one or more access permissions 139 to evaluate which of the federated services 123 the user is authorized to access or the user is prohibited from accessing. In some instances, the authentication service 119 can skip or omit this step and instead attempt to authenticate on behalf of the user with all of the federated services 123. In these instances, the authentication service 119 instead relies on the individual federated services 123 to properly evaluate the user's authorization to access them.

Proceeding to step 209, the authentication service 119 can send the SSO token 136 to one or more federated services 123. Some of the federated services 123 can have custom or unique workflows for authenticating a user or obtaining a user's consent to allow third-party programs such as the authentication service 119 interact with the federated service 123. Accordingly, the authentication service 119 can rely on a custom module or plugin that allows the authentication service 119 to interact with the federated service 123. Such a custom module or plugin can use an HTML, parser to identify components of an authentication or authorization web page for obtaining a user's consent to permit the authentication service 119 to access the federated service 123 and a custom hypertext transfer protocol (HTTP) request generator that can send customized HTTP requests to the federated service 123 to indicate a user's consent. The custom module or plugin may also parse HTTP headers of requests and responses to the federated service 123 to extract any necessary tokens or credentials. The custom module or plugin may also interact with any intermediary scripts as required.

Referring next to step 213, the authentication service 119 can receive an access token 143 and a refresh token 146. The access token 143 and the refresh token 146 can be included in a response that complies with a version of the OAUTH protocol. Upon receipt of the access token 143 and the refresh token 146, the authentication service 119 caches both the access token 143 and the refresh token 146 in the data store 126 and links the access token 143 and the refresh token 146 with corresponding user account 129 linked to the SSO token 136.

Moving on to step 216, the authentication service 119 can determine or evaluate the access token 143 to determine if it has expired or is about to expire. For example, the authentication service 119 can determine that the access token 143 is valid for 60 minutes, but the access token 143 was received more than 60 minutes ago. In an alternative example, the authentication service 119 can determine that the access token 143 is valid for 60 minutes, but was received 59 minutes ago and is therefore about to expire. This step can be performed on a periodic basis to minimize any service interruptions to the user due to an expired access token 143.

Upon expiration or imminent expiration of the access token 143, the authentication service 119 can evaluate the refresh token 146 to determine if the refresh token 146 remains valid. For example, the authentication service 119 can evaluate the refresh token 146 to determine if it has expired. Often times, refresh tokens 146 are valid for longer periods of time than access tokens 143. This allows for the refresh token 146 to be used to acquire multiple subsequent access tokens 143. As another example, the authentication service 119 can evaluate the refresh token 146 to determine whether or not the refresh token 146 has been revoked. For example, if a user's access to a federated service 123 had been revoked, the refresh token's rights to acquired new access tokens 143 can be revoked in order to deny the user further access to the federated service 123.

If the refresh token 146 is determined to be invalid, the flow of execution of the authentication service 119 returns to step 209. For example, if the refresh token 146 has expired, the flow of execution can return to step 209 in order for the authentication service 119 to acquire a new refresh token 146 and a new access token 143.

However, if the refresh token 146 remains valid, the flow of execution of the authentication service instead proceeds to step 223. Here, the authentication service 119 can send the refresh token 146 to the federated service 123 as part of a request to obtain a new access token 143. The request can be formatted to comply with a version of the OAUTH protocol in some embodiments.

Moving on to step 226, the authentication service 119 can receive the replacement access token 143 in response to the request sent at step 223. In some embodiments, the response containing the access token 143 can comply with a version of the OAUTH protocol. Upon receipt of the replacement access token 143, the authentication service 119 can replace the previous access token 143 cached in the data store 126 with the replacement access token 143. After receiving and caching the replacement access token 143, the flow of execution of the authentication service returns to step 216 in order to monitor the status of the replacement access token 143.

Figure 3:
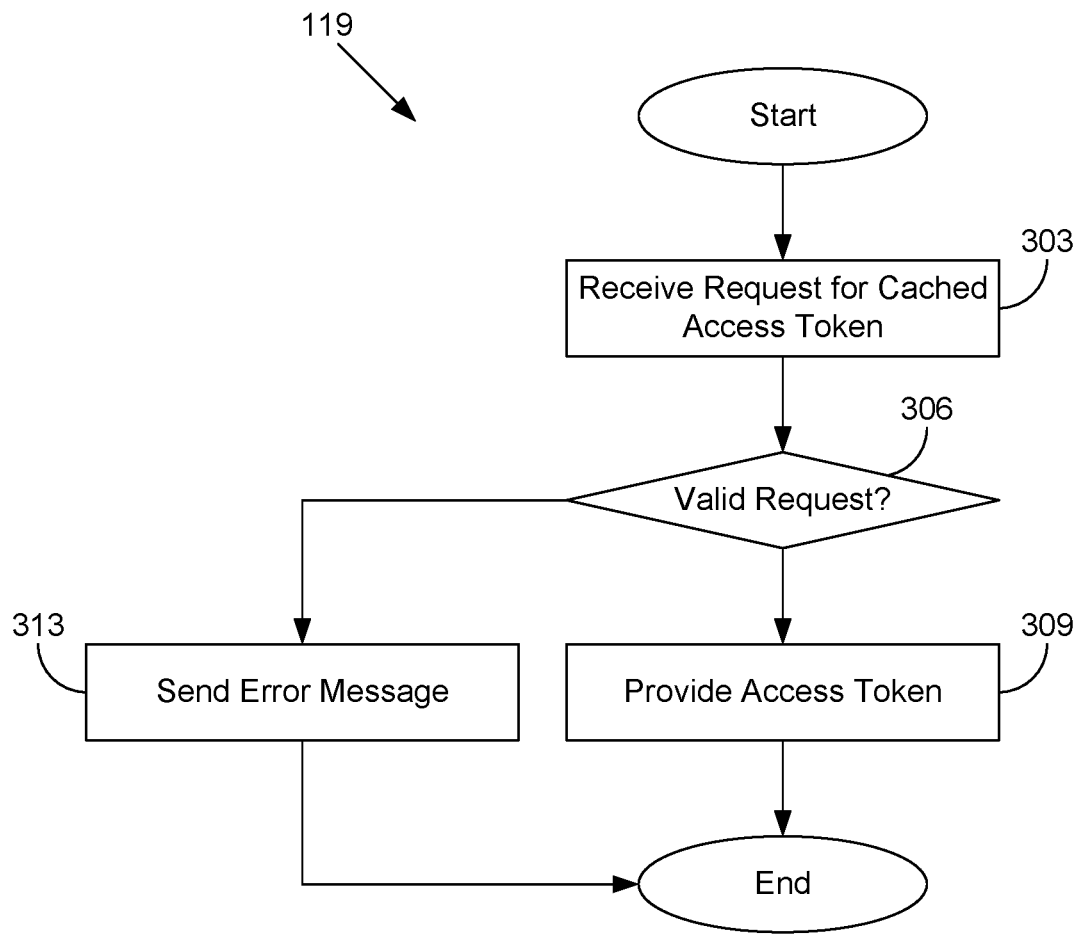
FIG. 3 is a flow chart depicting the operation of an example of a component of the client device of the network environment of FIG. 1.

FIG. 3 is another flowchart depicting an example of the operation of a portion of the authentication service 119. It is understood that the flowchart of FIG. 3 provides merely an example of the many different types of functional arrangements that can be employed to implement the portion of the authentication service 119 as described herein. As an alternative, the flowchart of FIG. 3 can be viewed as depicting an example of elements of a method implemented by the authentication service 119 in some implementations.

Beginning with step 303, the authentication service 119 can receive a request for a cached access token 143 linked with a user account 129, such as the access token 143 stored in the data store 126. The request can be received from a variety of sources. For example, the polling service 116 can send the request for the access token 143 to the authentication service 119 in some embodiments.

Moving on to step 306, the authentication service 119 can evaluate the request to determine if it is valid. For example, the authentication service 119 could determine whether the requesting application is authorized to use the authentication service. As another example, the authentication service 119 could determine whether the requesting application is authorized to access the user's access token 143.

Proceeding to step 309, the authentication service 119 can provide the access token 143 to the requesting process in a response. However, if the flow of execution instead proceeds from step 306 to step 313, the authentication service 119 can instead provide an error message to the requesting process indicating that access to the access token 143 was denied or that some other error occurred.

Figure 4:
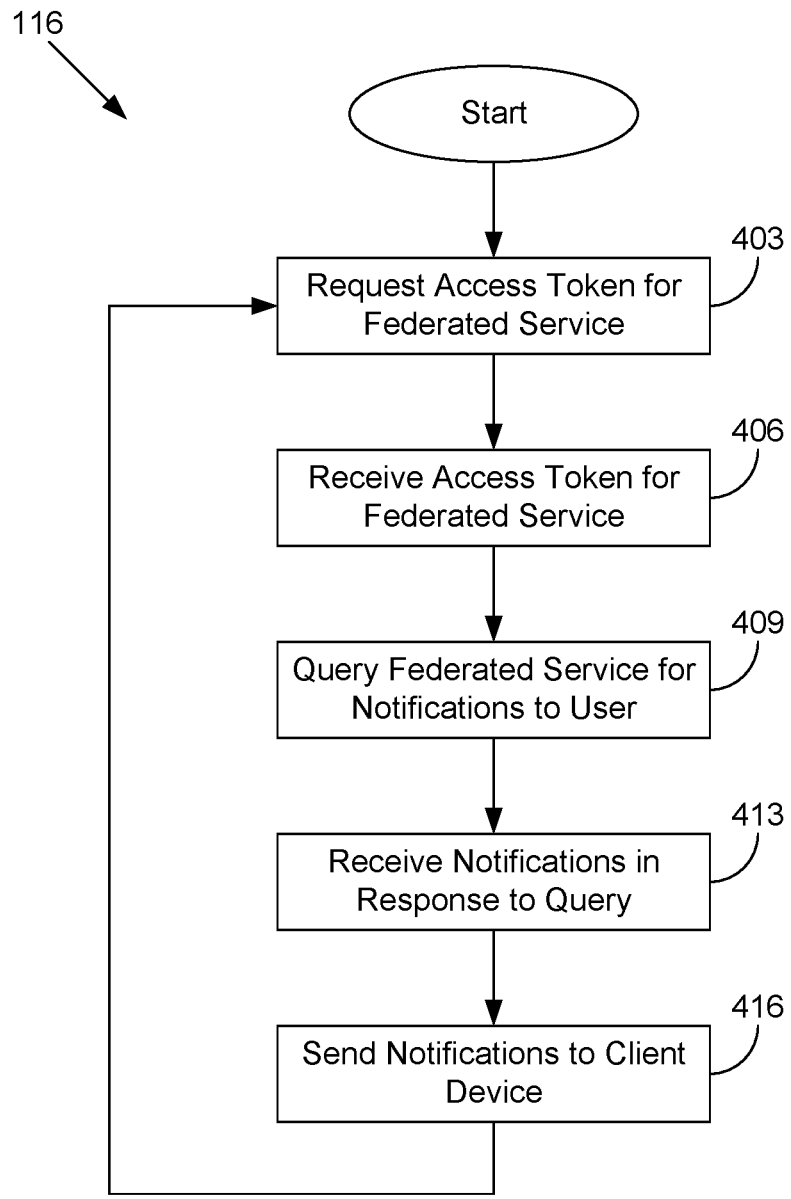
FIG. 4 is a flow chart depicting the operation of an example of a component of the client device of the network environment of FIG. 1.

FIG. 4 is a flowchart depicting an example of the operation of a portion of the polling service 116. It is understood that the flowchart of FIG. 4 provides merely an example of the many different types of functional arrangements that can be employed to implement the portion of the polling service 116 as described herein. As an alternative, the flowchart of FIG. 4 can be viewed as depicting an example of elements of a method implemented by the polling service 116 in some implementations.

Beginning at step 403, the polling service 116 can send a request to the authentication service 119 for an access token 143. The polling service 116 can include an identifier for the user account 129 as well as an identifier for a federated service 123.

Moving on to step 406, the polling service 116 receives the requested access token 143 in response. In some embodiments, the polling service 116 may cache the access token 143 for future use at this step. In these embodiments, the polling service 116 would have requested the access token 143 at step 403 in response to either the polling service 116 not having an access token 143 available or the polling service 116 requiring a new access token 143 because a previously cached access token 143 had expired.

Proceeding to step 409, the polling service 116 queries the federated service 123 for notifications, updates, messages, changes, actions to be performed, or other events relevant to the user represented by the user account 129 linked to the access token 143. For example, the polling service 116 can invoke a function of an application programming interface (API) provided by the federated service 123 to retrieve all new notifications, updates, messages, changes, actions to be performed, or other events. In this example, the polling service 116 could include the access token 143 to prove that the polling service 116 was authorized to receive a response that included the requested events or notifications. However, in some implementations, the polling service 116 may send the query to an intermediate service or connector, which in turn may retrieve the relevant information from the federated service 123.

Referring next to step 413, the polling service 116 receives a response from the federated service 123. In some implementations, however, the response may be received from an intermediate service or connector, as previously described. The response can include a list of events that had occurred since a previous query by the polling service 116. The response can also or alternatively include a list of notifications that have been generated since a previous query by the polling service 116. Likewise, the response can include one or more actions to be performed by the user with the federated service 123.

Moving next to step 416, the polling service 116 sends the notifications, updates, messages, changes, actions to be performed, or other events received at step 413 to the client device 106. For example, the polling service 116 could send or otherwise "push" the events or notifications to the client application 153 executing on the client device 106. The client application 153 could then render one or more of these notifications or events within a user interface 156 in order to inform the user of the event or notification.

For example, the polling service 116 may track whether a client application 153 has been associated with authentication credentials 133 for a federated service 123. For instance, a client application 153 or client device 106 may be registered with the polling service 116 to receive notifications, updates, messages, changes, actions to be performed, or other events from the federated service 123 through the polling service 116. As part of the registration process, the authentication credentials 133 (e.g., a user identifier such as a user account name) for the federated service 123 may be stored in association with the client application 153 or client device 106. This can allow the polling service 116 to determine which notifications from a federated service 123 a user wishes to receive and/or which client devices 106 or client applications 153 the notifications should be sent to. For example, a user may register his or her mobile phone or a client application 153 executing on the mobile phone to receive notifications, while declining to register his or her personal computer.

As another example, the polling service 116 can send a message to a user that contains the notifications, updates, messages, changes, actions to be performed, or other events. For example, a user may have an email address registered with the polling service 116 or a mobile phone number registered with the polling service 116. In these examples, the polling service 116 may send an email to the user containing notifications, updates, messages, changes, actions to be performed, or other events or a short message service (SMS) message containing the notifications, updates, messages, changes, actions to be performed, or other events. As another example, the polling service 116 may send an email or SMS message containing a link to the notifications, updates, messages, changes, actions to be performed, or other events rather than the notifications, updates, messages, changes, actions to be performed, or other events themselves.

After sending the notifications, updates, messages, changes, actions to be performed, or other events to the client device 106, the polling service 116 can then loop back to step 403 and repeat the process. For example, the polling service can perform an iteration on a periodic basis (e.g., every minute, every five minutes, every ten minutes, every 15 minutes, or some other period of time). As another example, the polling service 116 can be constantly iterated through steps 403-416 in order to retrieve and send notifications, updates, messages, changes, actions to be performed, or other events from one or more of the federated services 123 to the client device 106 in approximately real time.

Figure 5:
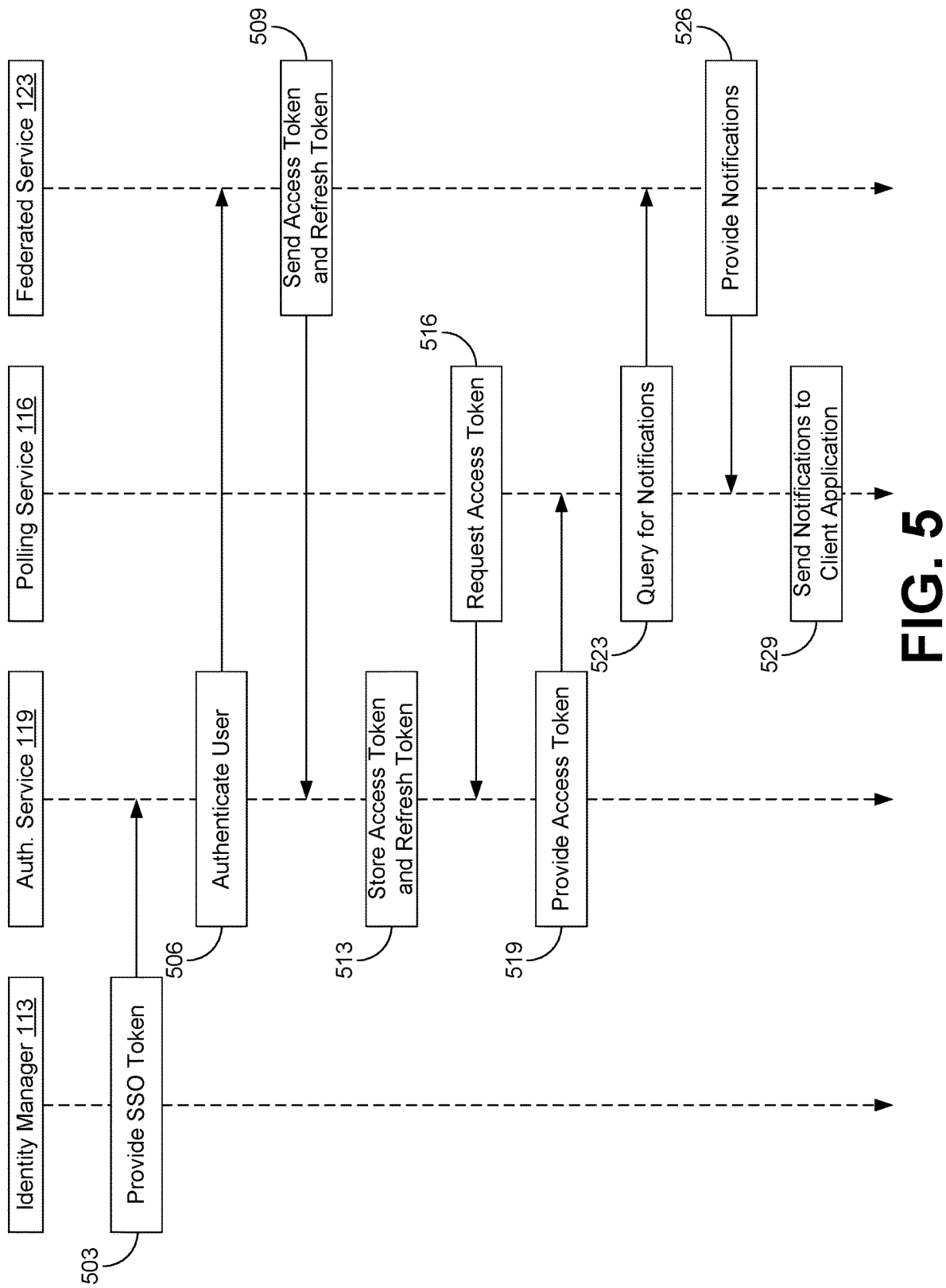
FIG. 5 is a sequence diagram depicting the operation of an example of a component of the client device of the network environment of FIG. 1.

FIG. 5 is a sequence diagram depicting an example of the interactions of various components of the network environment 100. It is understood that the sequence diagram of FIG. 5 provides merely an example of the many different types of functional arrangements that can be employed to implement the portions of the network environment 100 as described herein. As an alternative, the sequence diagram of FIG. 5 can be viewed as depicting an example of elements of a method implemented within the network environment 100 in some implementations.

Beginning with step 503, the identity manager 113 can provide a single sign-on (SSO) token 136 to the authentication service 119. The SSO token 136 can be provided in response to a successful authentication by a user with the identity manager 113.

Moving to step 506, the authentication service 119 can authenticate the user with a federated service 123. For example, the authentication service 119 can provide the SSO token 136 to the federated service 123, indicating that the user has already authenticated himself or herself with the identity manager 113 and should be granted access to the federated service 123. In response, the federated service 123 can determine that the user account 129 represented by the SSO token 136 is authorized to access or interact with the federated service 123.

In response, at step 509, the federated service 123 can provide an access token 143 and a refresh token 146 to the authentication service 119. The access token 143 or refresh token 146 can be generated in response to authentication of the user with the federated service 123 by the authentication service 119. A predefined period of time for which the access token 143 and the refresh token 146 are valid can also be generated, assigned, or otherwise determined at this point.

Proceeding to step 513, the authentication service 119 can store the access token 143 and the refresh token 146 that are provided by the federated service 123. Storing the access token 143 allows the authentication service 119 to provide the access token 143 to authorized applications. Likewise, storing the refresh token 146 allows the authentication service 119 to acquire new access tokens 143 as they expire.

Next, at step 516, the polling service 116 can request an access token 143 from the authentication service 119. This allows the polling service 116 to use the previously acquired access token 143 instead of performing its own authentication with the federated service 123 on behalf of the user. The request can include a user identifier and an identifier of the federated service 123 in order for the authentication service 119 to identify and return the correct access token 143.

In response, at step 519, the authentication service 119 can provide the requested access token 143 to the polling service 116.

At step 523, the polling service 116 can then send a query to the federated service 123 for any notifications, updates, messages, changes, actions to be performed, or other events intended for the user. The query can include the access token 143 provided by the authentication service 119 at step 519. Including the access token 143 allows the polling service 116 to prove to the federated service 123 that the polling service 116 is authorized to act on behalf of the user. However, in some implementations, the polling service 116 may send the query to an intermediate service or connector, which in turn may retrieve the relevant information from the federated service 123.

Next, at step 526, the federated service 123 provides one or more notifications, updates, messages, changes, actions to be performed, or other events to the polling service 116 in response to the query submitted at step 523. In some implementations, however, the response may be received from an intermediate service or connector, as previously described. In some embodiments, the notifications, updates, messages, changes, actions to be performed, or other events included in the response can be limited to those notifications, updates, messages, changes, actions to be performed, or other events that were not provided to the polling service 116 in response to a previous query.

Finally, at step 529, the polling service 116 sends to a client application 153 one or more of the notifications, updates, messages, changes, actions to be performed, or other events received from the federated service 123.

The flowcharts of FIGS. 2-4 and the sequence diagram of FIG. 5 show examples of the functionality and operation of implementations of components described herein. The components described herein can include hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts of FIGS. 2-4 and the sequence diagram of FIG. 5 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all variations are within the scope of the present disclosure.

The components described herein can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit.

The components described herein can be embodied in the form of hardware, as software components that are executable by hardware, or as a combination of software and hardware. If embodied as hardware, the components described herein can be implemented as a circuit or state machine that employs any suitable hardware technology. This hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as magnetic, optical, semiconductor, or other suitable media. Examples of a suitable computer-readable media include, but are not limited to, solid-state drives, magnetic drives, and flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All modifications and variations are intended to be included herein within the scope of this disclosure.

Therefore, the following is claimed:

1. A system for relaying authentication credentials, comprising:
   a computing device comprising a processor and a memory; and
   machine-readable instructions stored in the memory that, when executed by the processor, cause the computing device to at least:
      send an authentication request to a federated service, the authentication request comprising an SSO token associated with a user account;
      receive an access token, the access token providing access to the federated service for the user account;
      receive a request for the access token from a polling service executing on the computing device, the access token being cached in a data store of the computing device; and
      provide the access token to the polling service.

2. The system of claim 1, wherein the machine-readable instructions, when executed by the processor, further cause the computing device to at least:

receive a refresh token together with the access token;
send the refresh token to the federated service in response to an expiration of the access token; and
receive a second access token, the second access token providing access to the federated service for the user account.

3. The system of claim 1, wherein the machine-readable instructions, when executed by the processor, further cause the computing device to at least determine whether the request for the access token is valid based at least in part on whether the polling service is authorized to access the access token.

4. The system of claim 1, wherein the machine-readable instructions, when executed by the processor, further cause the computing device to at least determine that a user associated with the user account is authorized to access the federated service based at least in part on one or more access permissions.

5. The system of claim 1, wherein the machine-readable instructions, when executed by the processor, further cause the computing device to at least receive the SSO token and an identifier corresponding to the user account.

6. The system of claim 1, wherein the request for the access token comprises a user identifier corresponding to the user account.

7. The system of claim 1, wherein the request for the access token comprises an identifier corresponding to the federated service.

8. A method for relaying authentication credentials, comprising:
sending, by a computing device, an authentication request to a federated service, the authentication request comprising an SSO token associated with a user account;
receiving, by the computing device, an access token, the access token providing access to the federated service for the user account;
receiving, by the computing device, a request for the access token from a polling service executing on the computing device, the access token being cached in a data store of the computing device; and
providing, by the computing device, the access token to the polling service.

9. The method of claim 8, further comprising:
receiving, by the computing device, a refresh token together with the access token;
sending, by the computing device, the refresh token to the federated service in response to an expiration of the access token; and
receiving, by the computing device, a second access token, the second access token providing access to the federated service for the user account.

10. The method of claim 8, further comprising determining, by the computing device, whether the request for the access token is valid based at least in part on whether the polling service is authorized to access the access token.

11. The method of claim 8, further comprising determining, by the computing device, that a user associated with the user account is authorized to access the federated service based at least in part on one or more access permissions.

12. The method of claim 8, further comprising receiving, by the computing device, the SSO token and an identifier corresponding to the user account.

13. The method of claim 8, wherein the request for the access token comprises a user identifier corresponding to the user account.

14. The method of claim 8, wherein the request for the access token comprises an identifier corresponding to the federated service.

15. A non-transitory computer-readable medium for relaying authentication credentials, the non-transitory computer-readable medium comprising machine-readable instructions that, when executed by a processor, cause a computing device to at least:
send an authentication request to a federated service, the authentication request comprising an SSO token associated with a user account;
receive an access token, the access token providing access to the federated service for the user account;
receive a request for the access token from a polling service executing on the computing device, the access token being cached in a data store of the computing device; and
provide the access token to the polling service.

16. The non-transitory computer-readable medium of claim 15, wherein the machine-readable instructions, when executed by the processor, further cause the computing device to at least:
receive a refresh token together with the access token;
send the refresh token to the federated service in response to an expiration of the access token; and
receive a second access token, the second access token providing access to the federated service for the user account.

17. The non-transitory computer-readable medium of claim 15, wherein the machine-readable instructions, when executed by the processor, further cause the computing device to at least determine whether the request for the access token is valid based at least in part whether the polling service is authorized to access the access token.

18. The non-transitory computer-readable medium of claim 15, wherein the machine-readable instructions, when executed by the processor, further cause the computing device to at least determine that a user associated with the user account is authorized to access the federated service based at least in part on one or more access permissions.

19. The non-transitory computer-readable medium of claim 15, wherein the machine-readable instructions, when executed by the processor, further cause the computing device to at least receive the SSO token and an identifier corresponding to the user account.

20. The non-transitory computer-readable medium of claim 15, wherein the request for the access token comprises at least one of a user identifier corresponding to the user account and an identifier corresponding to the federated service.

* * * * *